(12) United States Patent
Chow et al.

(10) Patent No.: US 7,850,082 B1
(45) Date of Patent: Dec. 14, 2010

(54) EXTENDED UNIVERSAL SERIAL BUS (USB) CARD READER

(75) Inventors: David Q. Chow, San Jose, CA (US); Charles C. Lee, Cupertino, CA (US); Frank I-Kang Yu, Palo Alto, CA (US); Ming-Shiang Shen, Taipei (TW)

(73) Assignee: Super Talent Electronics, Inc., San Jose, CA (US)

( * ) Notice: Subject to any disclaimer, the term of this patent is extended or adjusted under 35 U.S.C. 154(b) by 584 days.

(21) Appl. No.: 11/932,118

(22) Filed: Oct. 31, 2007

Related U.S. Application Data

(63) Continuation-in-part of application No. 11/864,696, filed on Sep. 28, 2007, and a continuation-in-part of application No. 11/624,667, filed on Jan. 18, 2007, and a continuation-in-part of application No. 11/623,863, filed on Jan. 17, 2007, and a continuation-in-part of application No. 10/956,826, filed on Oct. 1, 2004, now Pat. No. 7,299,316.

(51) Int. Cl.
*G06K 7/08* (2006.01)
(52) U.S. Cl. ........................ 235/451; 439/638
(58) Field of Classification Search ................ 235/451; 439/638
See application file for complete search history.

(56) References Cited

U.S. PATENT DOCUMENTS

| | | |
|---|---|---|
| 5,623,552 A | 4/1997 | Lane |
| 5,907,856 A | 5/1999 | Estakhri et al. |
| 5,959,541 A | 9/1999 | DiMaria et al. |
| 6,000,006 A | 12/1999 | Bruce et al. |
| 6,012,636 A | 1/2000 | Smith |
| 6,069,920 A | 5/2000 | Schulz et al. |
| 6,081,858 A | 6/2000 | Abudayyeh et al. |
| 6,125,192 A | 9/2000 | Bjorn et al. |
| 6,193,152 B1 | 2/2001 | Fernando et al. |
| 6,202,138 B1 | 3/2001 | Estakhri et al. |
| 6,230,233 B1 | 5/2001 | Lofgren et al. |
| 6,275,894 B1 | 8/2001 | Kuo et al. |
| 6,321,478 B1 | 11/2001 | Klebes |
| 6,547,130 B1 | 4/2003 | Shen |
| 6,561,421 B1 * | 5/2003 | Yu ............................. 235/451 |
| 6,636,929 B1 | 10/2003 | Frantz et al. |
| 6,718,407 B2 | 4/2004 | Martwick |
| 6,808,424 B2 * | 10/2004 | Kaneshiro et al. ........... 439/638 |
| 6,880,024 B2 | 4/2005 | Chen et al. |

(Continued)

*Primary Examiner*—Jamara A Franklin
(74) *Attorney, Agent, or Firm*—Blakely Sokoloff Taylor & Zafman LLP

(57) ABSTRACT

An extended universal serial bus (USB) card reader device is described herein. In one embodiment, a card reader includes a first extended USB (EUSB) connector to be coupled to an external host system, multiple flash memory card sockets capable of receiving multiple flash memory cards inserted therein, multiple flash controllers coupled to the plurality of flash memory card sockets respectively. The card reader further includes a memory for storing executable code, a processor coupled to each of the flash controllers for executing the executable code to control each of the plurality of flash controllers in order to access the corresponding flash memory card inserted therein. The card reader further includes a second EUSB connector to be coupled to an external EUSB device using the extended USB protocols, which is one of an EUSB slave device and an EUSB hub device. Other methods and apparatuses are also described.

8 Claims, 11 Drawing Sheets

U.S. PATENT DOCUMENTS

| | | |
|---|---|---|
| 7,103,765 B2 | 9/2006 | Chen |
| 7,249,978 B1 | 7/2007 | Ni |
| 7,257,714 B1 | 8/2007 | Shen |
| 7,383,992 B2 * | 6/2008 | Le .................... 235/441 |
| 7,440,286 B2 * | 10/2008 | Hiew et al. ............. 361/737 |
| 2001/0043174 A1 | 11/2001 | Jacobsen et al. |
| 2002/0166023 A1 | 11/2002 | Nolan et al. |
| 2003/0046510 A1 | 3/2003 | North |
| 2003/0163656 A1 | 8/2003 | Ganton |
| 2004/0148482 A1 | 7/2004 | Grundy et al. |
| 2004/0255054 A1 | 12/2004 | Pua et al. |
| 2005/0102444 A1 | 5/2005 | Cruz |
| 2005/0120146 A1 | 6/2005 | Chen et al. |
| 2005/0160213 A1 | 7/2005 | Chen |
| 2005/0193161 A1 | 9/2005 | Lee et al. |
| 2005/0246243 A1 | 11/2005 | Adams et al. |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2007/0094489 A1 | 4/2007 | Ota et al. |
| 2007/0113067 A1 | 5/2007 | Oh et al. |
| 2007/0113267 A1 | 5/2007 | Iwanski et al. |
| 2007/0130436 A1 | 6/2007 | Shen |

* cited by examiner

| SIDE | PIN-OUT | USB | MODIFIED PCIE 0 | eSATA | MODIFIED PCIE 1 | MODIFIED PCIE 2 | MODIFIED PCIE 3 |
|---|---|---|---|---|---|---|---|
| A | 1 | 5V | 5V | 5V | 5V | 5V | 5V |
| A | 2 | D- | D- | D- | D- | D- | D- |
| A | 3 | D+ | D+ | D+ | D+ | D+ | D+ |
| A | 4 | GND | GND | GND | GND | GND | GND |
| B | 1 |  | 3.3V | 3.3V | PETn | PETn | PETn |
| B | 2 |  | 1.5V | N/C | PETp | PETp | PETp |
| B | 3 |  | PETn | T- | GND | GND | GND |
| B | 4 |  | PETp | T+ | PERn | PERn | PERn |
| B | 5 |  | GND | GND | PERp | PERp | PERp |
| B | 6 |  | PERn | R- |  | PETn 1 | PETn 1 |
| B | 7 |  | PERp | R+ |  | PETp 1 | PETp 1 |
| B | 8 |  | N/C | 12V |  | GND | GND |
| B | 9 |  |  |  |  | PERn 1 | PERn 1 |
| B | 10 |  |  |  |  | PERp 1 | PERp 1 |
| B | 11 |  |  |  |  |  | PETn 2 |
| B | 12 |  |  |  |  |  | PETp 2 |
| B | 13 |  |  |  |  |  | GND |
| B | 14 |  |  |  |  |  | PERn 2 |
| B | 15 |  |  |  |  |  | PERp 2 |
| B | 16 |  |  |  |  |  | PETn 3 |
| B | 17 |  |  |  |  |  | PETp 3 |
| B | 18 |  |  |  |  |  | GND |
| B | 19 |  |  |  |  |  | PERn 3 |
| B | 20 |  |  |  |  |  | PERp 3 |

FIG. 5

EXTENDED UNIVERSAL SERIAL BUS (USB) CARD READER

RELATED APPLICATIONS

This application is a continuation-in-part (CIP) of co-pending U.S. patent application Ser. No. 11/864,696, filed Sep. 28, 2007, entitled "Backward Compatible Extended USB Plug and Receptacle With Dual Personality", U.S. patent application Ser. No. 11/623,863, filed Jan. 17, 2007, entitled "Secure Flash-Memory Card Reader with Host-Encrypted Data on a Flash-Controller-Mastered Bus Parallel to a Local CPU Bus Carrying Encrypted Hashed Password and User ID", U.S. patent application Ser. No. 10/956,826, filed Sep. 1, 2005, entitled "USB Card Reader", and U.S. patent application Ser. No. 11/624,667, filed Jan. 18, 2007, entitled "Electronic data Storage Medium with Fingerprint Verification Capability". The disclosure of the above-identified applications and patents is incorporated by reference herein in its entirety.

FIELD OF THE INVENTION

The present invention relates generally to a USB card reader. More particularly, this invention relates to an extended USB (EUSB) card reader.

BACKGROUND

FIG. 1 is a block diagram illustrating a typical USB system with a USB flash card reader. Referring to FIG. 1, an integrated circuit card 1 is shown to be accessed by a card reader 2 that is capable of establishing a communications link with a host computer 3. The integrated circuit card 1 includes a card body 18, a memory device 11 mounted on the card body 18, a fingerprint sensor 12 mounted on the card body 18, a card reader interface circuit 13 mounted on the card body 18, a processing unit 14 mounted on the card body 18, a battery 15 mounted on the card body 18, a function key set 16 mounted on the card body 18, and a display unit 17 mounted on the card body 18.

Memory device 11 is a flash memory. The memory device 11 stores fingerprint reference data obtained previously by scanning a fingerprint of assigned users, users passwords and card information. The fingerprint reference data includes a plurality of scan line data, each of which describes fingerprint characteristics in a respective scanning line of the fingerprint of the assigned user.

The fingerprint sensor 12 is adapted to scan a fingerprint 5 of a holder of the card body 18 and to generate fingerprint scan data. The card reader interface circuit 13 can be activated so as to communicate with the card reader 2. The processing unit 14 is connected to the memory device 11, the fingerprint sensor 12 and the card reader interface circuit 13. The processing unit 14 receives the fingerprint scan data from the fingerprint sensor 12, and compares the fingerprint scan data with the fingerprint reference data in the memory device 11 to verify if the holder of the card body 18 is one of the assigned users. The processing unit 14 activates the card reader interface circuit 13 for exchanging the card information with the host computer 3 via the card reader 2 upon verifying that the holder of the card body 18 is the assigned user. Thus, the integrated circuit card cannot be used if the card holder is not the assigned user. The battery 15 is connected to the processing unit 14 and provides electrical power required by the integrated circuit card 1.

The function key set 16 is connected to the processing unit 14, and is operable so as to select the card information that is exchanged with the host computer 3. Preferably, a segment of the fingerprint reference data stored in the memory device 11 is transmitted by the processing unit 14 to the host monitor 3 upon verifying that the holder of the card body 18 is the assigned user for increased security of network transaction. The segment of the fingerprint reference data includes chosen ones of the scan line data selected according to date or time of the exchange of the card information with the host computer 3. Alternatively, the chosen ones of the scan line data can be selected in a random manner.

The display unit 17 is connected to and is controlled by the processing unit 14 for displaying the card information that is exchanged with the host computer 3 thereon. The display unit 17 can be further used to display information from the host computer 3. However, such a USB system as shown in FIG. 1 cannot support extended USB (EUSB) interfaces.

SUMMARY OF THE DESCRIPTION

An extended universal serial bus (USB) card reader device is described herein. In one embodiment, a card reader includes a first extended USB (EUSB) connector to be coupled to an external host system, the first EUSB connector capable of communicating with the external host system according to extended USB protocols, multiple flash memory card sockets capable of receiving a plurality of flash memory cards inserted therein, multiple flash controllers coupled to the plurality of flash memory card sockets respectively. Each controller corresponds to one of the flash memory card sockets for controlling the corresponding flash memory card sockets, including reading and writing data from and to a flash memory card inserted in the associated socket. The card reader further includes a memory for storing executable code, a processor coupled to each of the plurality of flash controllers, where the processor executes the executable code retrieved from the memory to control each of the plurality of flash card host controllers in order to access the corresponding flash memory card inserted therein. The card reader further includes a second EUSB connector to be coupled to an external EUSB device using the extended USB protocols, where the external EUSB device is one of an EUSB slave device and an EUSB hub device.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 5 is a table of extended and standard pins in one embodiment of an extended USB connector and socket.

DETAILED DESCRIPTION

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
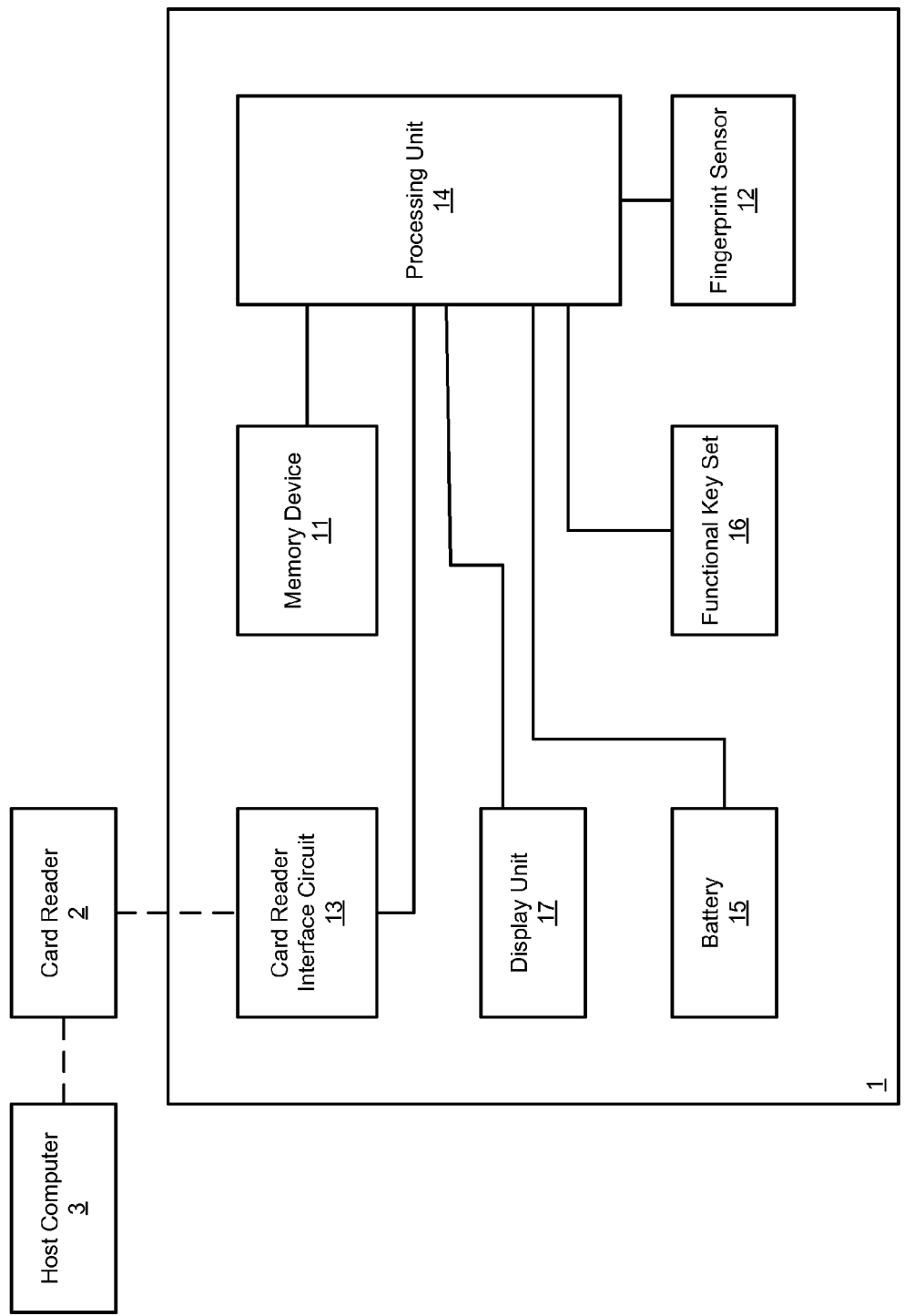
FIG. 1 is a block diagram illustrating a typical USB system with a USB card reader.
Figure 2:
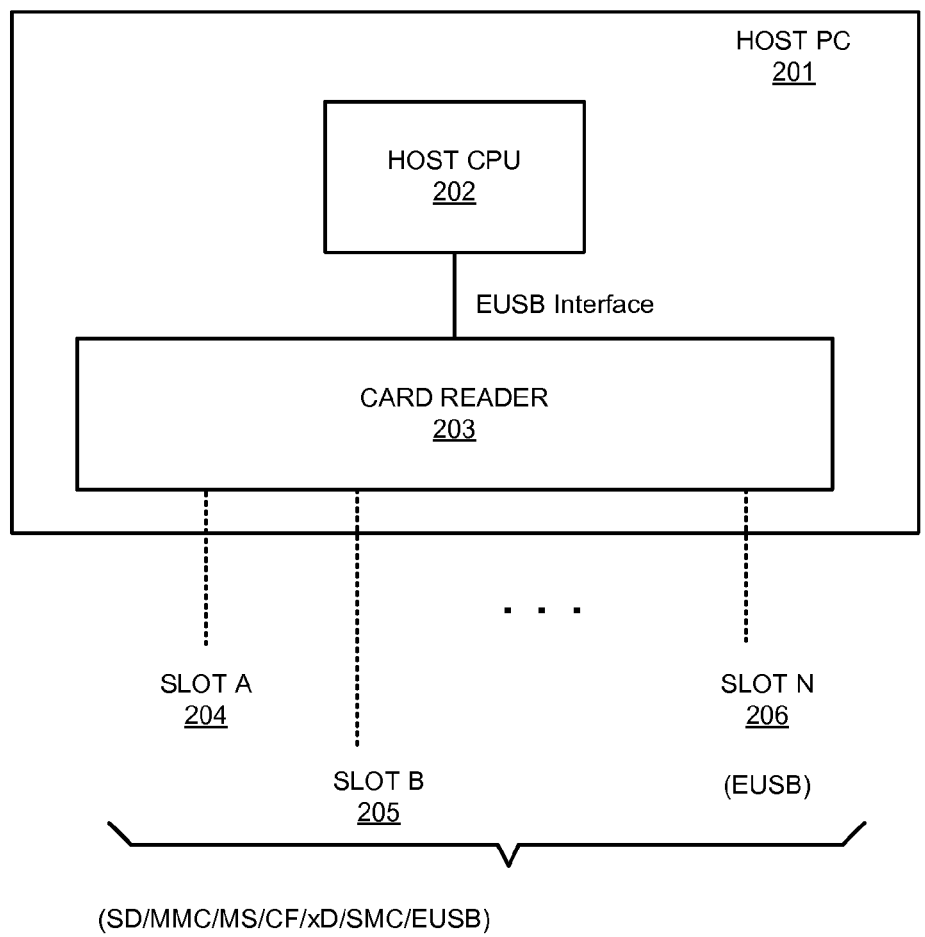
FIG. 2 is a block diagram illustrating an EUSB system according to one embodiment of the invention.

According to certain embodiments of the invention, an EUSB card reader is provided to provide multiple interfaces for a variety of different card interfaces. FIG. 2 is a block diagram illustrating an EUSB system according to one embodiment of the invention. Referring to FIG. 2, host computer 201 includes, but is not limited to, a host processor 202 coupled to an EUSB card reader 203 via an EUSB interface. The EUSB card reader 203 includes multiple slots 204-206 to support various portable card interfaces having different form factors, such as, for example, secure digital (SD), multimedia card (MMC), compact flash (CF), and EUSB card, etc.

Figure 3:
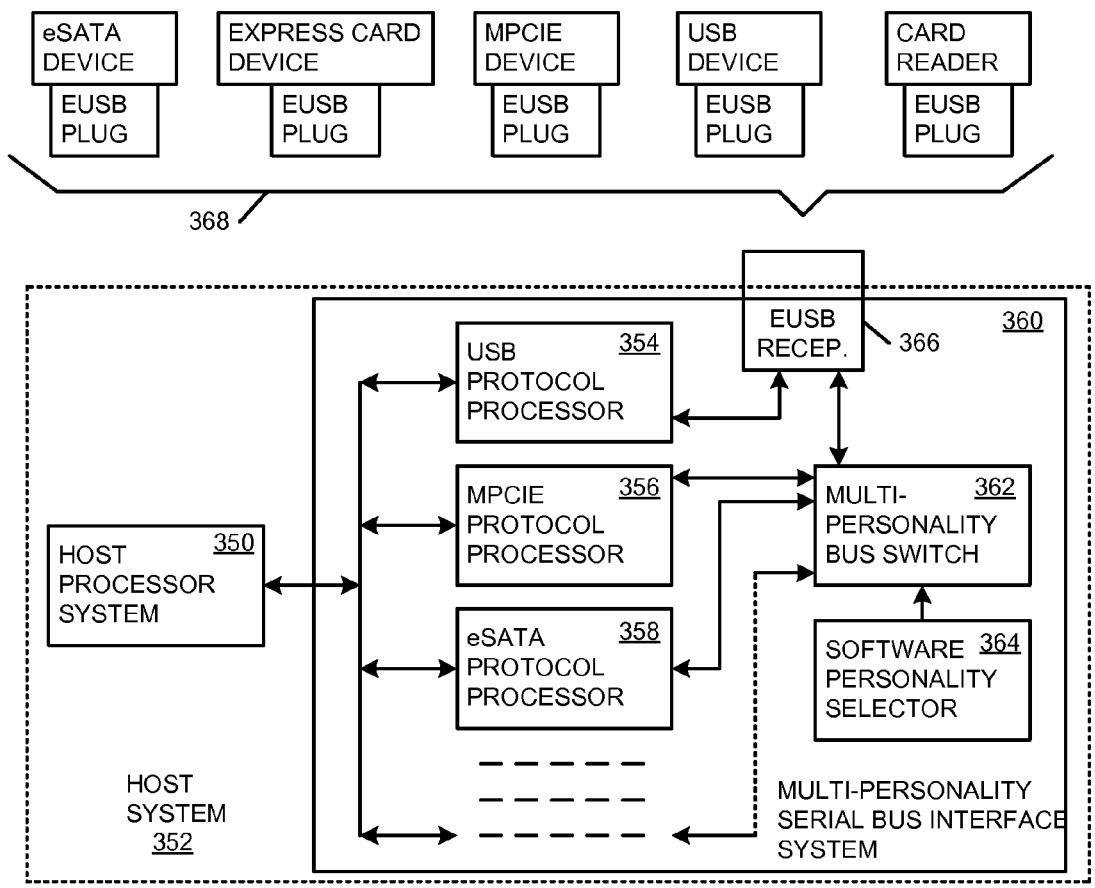
FIG. 3 is a block diagram illustrating an example of EUSB system according to one embodiment of the invention.

FIG. 3 is a block diagram illustrating an example of EUSB system according to one embodiment of the invention. For example, the EUSB system as shown in FIG. 3 may be implemented as part of system shown in FIG. 2. Referring to FIG. 3, a variety of extended-USB or USB peripherals 368 could be plugged into extended-USB socket 366 of host 352. For example, a SATA peripheral, a PCI-Express peripheral, a Firewire IEEE 1394 peripheral, a Serial-Attached SCSI peripheral, or a USB-only peripheral could be inserted. Each can operate in its own standard mode. In addition, an EUSB compatible card reader may also be inserted into EUSB receptacle 366, where the EUSB card reader can further receive additional portable cards having various interfaces as mentioned above, including an EUSB card.

Host 352 has processor system 350 for executing programs including USB-management and bus-scheduling programs. Multi-personality serial-bus interface 360 processes data from processor system 350 using various protocols. USB processor 354 processes data using the USB protocol or EUSB protocol, and inputs and outputs USB data on the USB differential data lines in extended USB socket 366. In one embodiment, the EUSB protocol is utilized such that no polling from the host is needed. Instead, both end points of the EUSB interface can actively communicate with each other, for example, signaling the other end that it is ready (RDY) or not yet ready (NYET), etc.

The extended metal contact pins in extended USB socket 366 connect to multi-personality bus switch 362. Transceivers in multi-personality bus switch 362 buffer data to and from the transmit and receive pairs of differential data lines in the extended metal contacts for extended protocols such as PCI-Express, Firewire IEEE 1394, Serial-Attached SCSI, and SATA. When an initialization routine executed by processor system 350 determines that inserted peripheral 368 supports SATA, personality selector 364 configures multi-personality bus switch 362 to connect extended USB socket 366 to SATA processor 358. When the initialization routine executed by processor system 350 determines that inserted peripheral 368 supports PCI-Express, personality selector 364 configures multi-personality bus switch 362 to connect extended USB socket 366 to PCI-Express processor 356. Then processor system 350 communicates with either PCI-Express processor 356 or SATA processor 358 instead of USB processor 354 when extended mode is activated.

Figure 4:
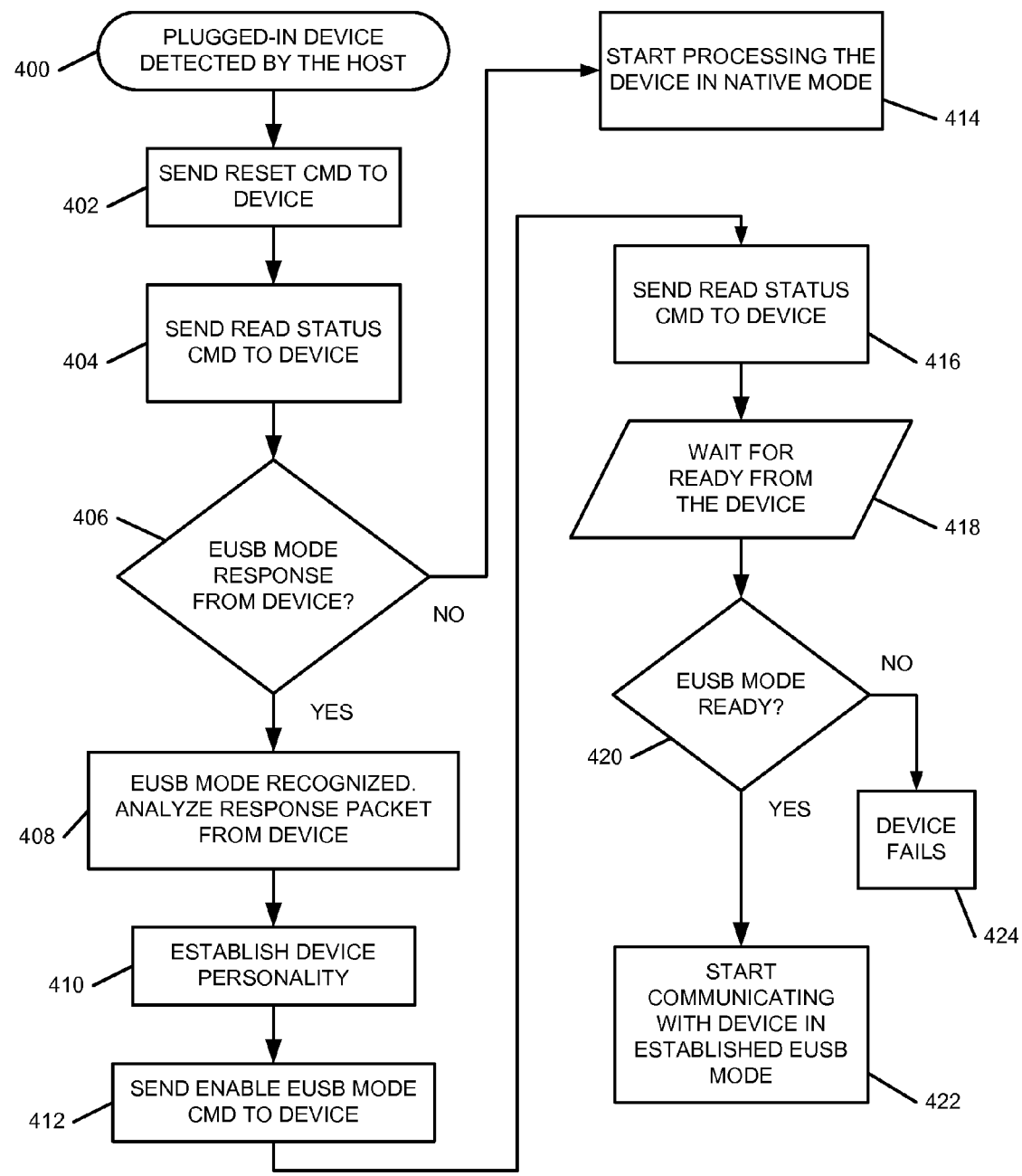
FIG. 4 is a flowchart of one embodiment of an initialization routine executed by a host for detecting a device plugged into an extended USB socket.

FIG. 4 is a flowchart of one embodiment of an initialization routine executed by a host for detecting a device plugged into an extended USB socket. A host such as a PC can have an extended USB socket. Either an extended USB device, or a standard USB device can be plugged into the extended USB socket. This routine detects whether the inserted device supports extended-USB mode or only standard USB mode. The routine may be executed by processor system 350 of FIG. 3.

Referring to FIG. 4, the host detects a newly-inserted device plugged into the extended USB socket, step 400, such as by detecting resistance changes on the metal contact pins of the extended USB socket. When the newly-inserted device is detected, a USB reset command is sent over the USB differential signal lines to the device, step 402. A USB read-status command is then sent by the host, step 404.

The peripheral device responds by sending its status information using USB protocols. The host examines this status information, and in particular looks for a mode identifier indicating that the peripheral supports extended-USB mode. This mode identifier can be a status bit or a unique code in an area reserved for use by the peripheral vendor to identify the peripheral's type or capabilities.

When the peripheral responds with a status indicating no extended-USB support, step 406, then processing continues in native USB mode, step 414. Standard USB transactions are performed between the host and the peripheral using the differential USB data pins in the four-pin side of the extended USB socket. The peripheral likely has a standard USB connector that has only 4 metal contact pins, not the extension with the 8 additional metal contact pins.

When the peripheral responds with a status indicating extended-USB support, step 406, then the host further examines the packet from the peripheral to determine that the peripheral can support higher-speed communication using the extended metal contact pins, step 408. The peripheral has an extended USB connector with the 8 additional metal contact pins in an extension portion of the connector.

The host can further examine the capabilities of the peripheral, such as to determine which extended modes are supported, step 410. Some peripherals may support PCI-Express communication in extended mode, while others support Serial-ATA, Serial Attached SCSI, or IEEE 1394 as the extended-mode protocol.

The host then sends a vendor-defined USB OUT command to the peripheral, step 412. This command instructs the peripheral to activate its extended mode of operation. The host verifies that the device received the command by reading its status again, step 416. The peripheral responds with a ready status, step 418. If the status read back from the device does not indicate that the peripheral is ready to switch to extended mode, step 420, then the device fails, step 424. The host could fall back on standard USB mode, step 414, or attempt again to activate extended mode, step 402. After trying a predetermined number of times, the host falls back on standard USB mode, step 414.

When the peripheral responds with the correct ready, step 420, then the host and peripheral can begin communicating in the extended mode. The 8 additional metal contact pins in the extended portion of the USB connector and socket are used for communication rather than the 4 USB metal contact pins. For example, the PCI-Express transmit and receive differential pairs can be used to bi-directionally send and receive data when the device has a PCI-Express personality. The host uses these extended pins to send a read-status command to the peripheral, step 422. Data can be sent and received at the higher rates supported by PCI-Express rather than the slower USB rates.

FIG. 5 is a table of extended and standard pins in one embodiment of an extended USB connector and socket. The A side of the pin substrates contains the four standard USB signals, which include a 5-volt power signal and ground. The differential USB data D−, D+ are carried on pins 2 and 3. These pins are not used for extended modes.

Side B of the pin substrates, or the extension of the primary surfaces, carries the extended signals. Pin 1 is a 3.3-volt power signal for modified PCI-Express generation 0 and external Serial-ATA (eSATA), while pin 2 is a 1.5-volt supply for modified PCI-Express generation 0 and reserved for eSATA. For modified PCI-Express generations 1, 2, and 3, pins 1 and 2 carry the transmit differential pair, called PETn, PETp, respectively. Pin 8 is a 12-volt power supply for eSATA and reserved for modified PCI-Express generation 0. Pin 8 is a ground for modified PCI-Express generations 2 and 3. Pin 5 is a ground for modified PCI-Express generation 0 and eSATA.

Pins 3 and 4 carry the transmit differential pair, PETn, PETp, respectively, for modified PCI-Express generation 0, and T−, T+, respectively, for SATA. Pin 3 is a ground for modified PCI-Express generations 1, 2, and 3. Pin 4 and pin 5 carry receive differential pair, called PERn and PERp, respectively, for modified PCI-Express generations 1, 2, and 3. Pins 6 and 7 carry the receive differential pair, PERn, PERp, respectively, for modified PCI-Express generation 0 and R−, R+, respectively, for eSATA. Pins 6 and 7 carry a second transmit differential pair, called PETn1 and PETp1, respectively, for modified PCI-Express generations 2 and 3.

Pins 9 and 10 carry a second receive differential pair, called PERn1 and PERp1, respectively, for modified PCI-Express generations 2 and 3.

Pins 11 and 12 carry a third transmit differential pair, called PETn2 and PETp2, respectively, for modified PCI-Express generation 3. Pin 13 is a ground for modified PCI-Express generation 3. Pins 14 and 15 carry a third receive differential pair, called PERn2 and PERp2, respectively, for modified PCI-Express generation 3.

Pins 16 and 17 carry a fourth transmit differential pair, called PETn3 and PETp3, respectively, for modified PCI-Express generation 3. Pin 18 is a ground for modified PCI-Express generation 3. Pins 19 and 20 carry a fourth receive differential pair, called PERn3 and PERp3, respectively, for modified PCI-Express generation 3.

Figure 10:
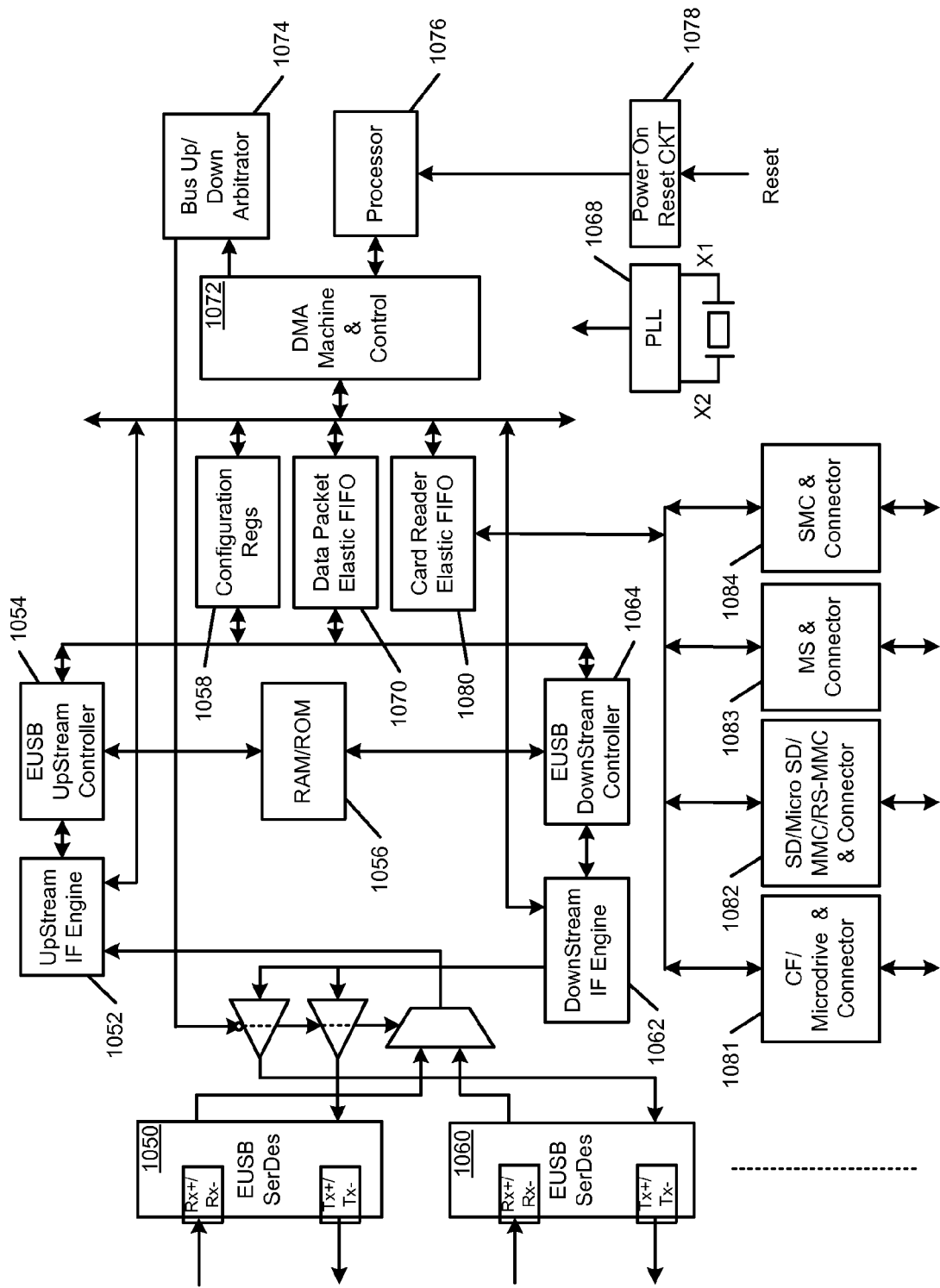
FIG. 10 is a block diagram illustrating an EUSB card reader according to an alternatively embodiment of the invention.

The ExpressCard pins REFCLK+, REFCLK−, CPPE#, CLKREQ#, PERST#, and WAKE# are not used in the extended USB connector to reduce the pin count. Additional pins may be added to the extended USB connector and socket if some or all of these pins are desired. Furthermore, the pin names and signal arrangement (or order) illustrated in FIG. 10 is merely one embodiment. It should be apparent that other pin names and signal arrangement (or order) may be adopted in other embodiments.

Figure 6:
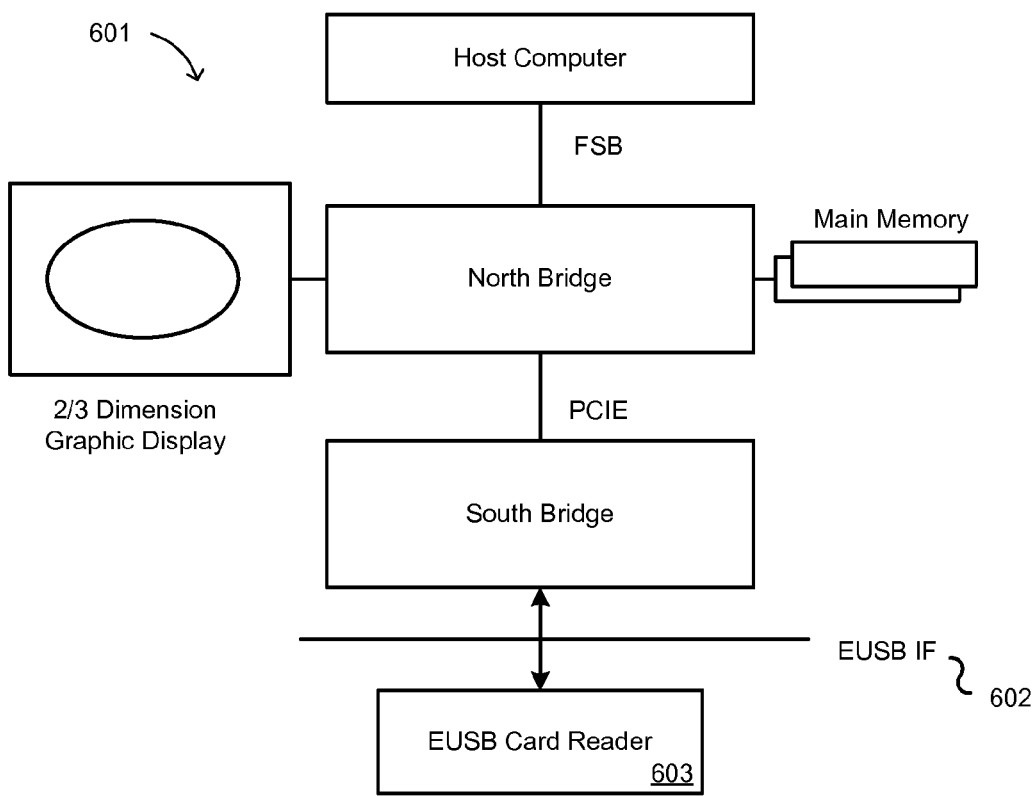
FIG. 6 is a block diagram illustrating an exemplary extended USB (EUSB) system according to one embodiment of the invention.

FIG. 6 is a block diagram illustrating an exemplary extended USB (EUSB) system according to one embodiment of the invention. As hardware configuration, an EUSB device 603 (e.g., EUSB card reader in this example) is coupled to a host system 601 via an EUSB interface 602. Host 601 can be any of computer having an EUSB interface 602, including one or more processors coupled to, for example, via a front-side bus (FSB) a memory controller (also referred to as a north bridge) of which a main memory and a display device is attached. The memory controller is coupled to, for example, a PCI express bus to an IO controller (also referred to as a south bridge), from which an EUSB device 603 is attached.

Figure 7:
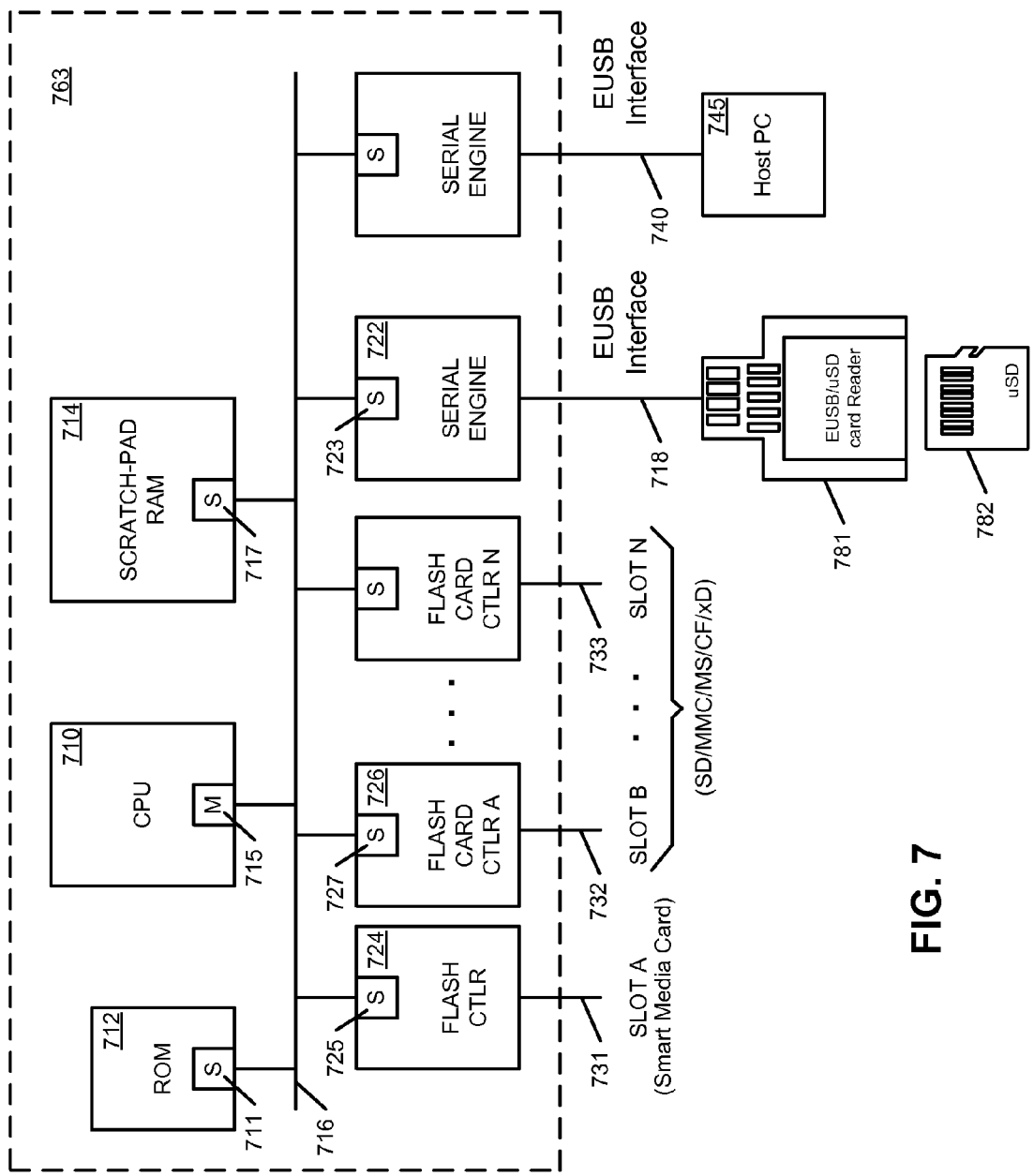
FIG. 7 shows an EUSB card reader according to one embodiment of the invention.

FIG. 7 shows an EUSB card reader according to one embodiment of the invention. Flash-card controllers 724, 726 read or write flash memory on flash cards inserted into slots A, B of flash-card reader controller device 763, which may be a variety of different card interfaces, such as, for example, Smart Media card, secure digital (SD) card, multi-media card (MMC), etc. Processor 710 executes routines stored in ROM 712 that include routines to send commands to flash-card controllers 724, 726 to read and write the flash memory. CPU 710 also controls serial engine 722, which transfers data serially over EUSB links 718 and/or 740, which may be coupled to another EUSB or micro-SD card reader 781 in which a micro-SD card 782 may be inserted, or alternatively coupled to a host 745.

Data is normally transferred byte-by-byte directly from flash-card controllers 724, 726 to CPU 710 and then to serial engine 722 without storage in scratch-pad RAM 714. The width of bus 716 is often 8-bits (byte), but can be wider, such as 16-bit or 32-bit.

Data-transfer rates may be limited by bus 716. Bus 716 is a CPU-controlled bus. Master port 715 on CPU 710 acts as a bus master, controlling data transfer to and from one of slave ports 711, 717, 723, 725, 727 on ROM 712, scratch-pad RAM 714, serial engine 722, and flash-card controllers 724, 726, respectively.

Figure 8:
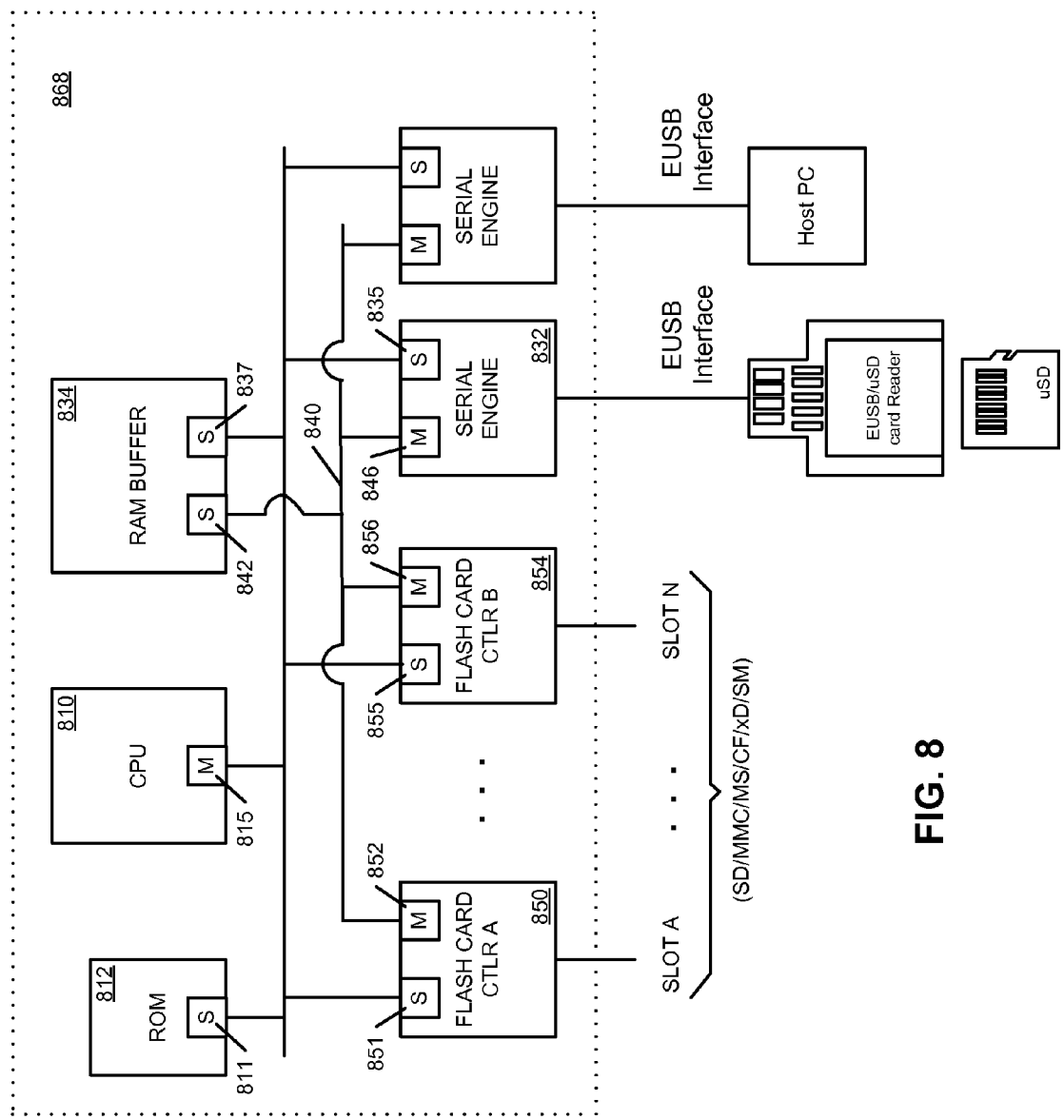
FIG. 8 shows a flash drive with a flash-serial buffer bus in parallel with the CPU bus with external and internal RAM buffers.

FIG. 8 shows a flash drive with a flash-serial buffer bus in parallel with the CPU bus with internal RAM buffers. CPU bus 838 inside flash drive controller chip 868 allows CPU 810 to access instructions in ROM 812, using master port 815 and slave port 811. Master port 815 can also allow CPU 810 to write commands to flash-card controller 850 through its slave port 851, to flash-card controller 854 through its slave port 855, or to serial engine 832 through its slave port 835 connected to CPU bus 838.

Likewise, serial engine 832 can use its master port 846 to access either slave port 842 of internal RAM buffer 834. Other functional blocks may be integrated onto chip 868 besides flash-card controllers 850, 854 and may connect to CPU bus 838 or flash-serial buffer bus 840.

Once CPU 810 programs flash-card controllers 850, 854, or serial engine 832, data transfers can take place without using CPU bus 838. Data is sent over bus 840 to slave port 842 of RAM buffer 834. Once one or more blocks of flash data have been written into RAM buffer 834 by flash-card controller 850 or 854, serial engine 832 can read the flash data and serially transmit the flash data over USB link 818, uploading the data to a PC or other host device. Serial engine 832 uses its master port 846 to read the flash data in RAM buffer 834 using slave port 842.

In addition, flash card controllers 850-854 are used to control a variety of card slots which may include any of the card interfaces mentioned above. Serial engine 832 may be used to couple to another EUSB card reader or a host.

Figure 9:
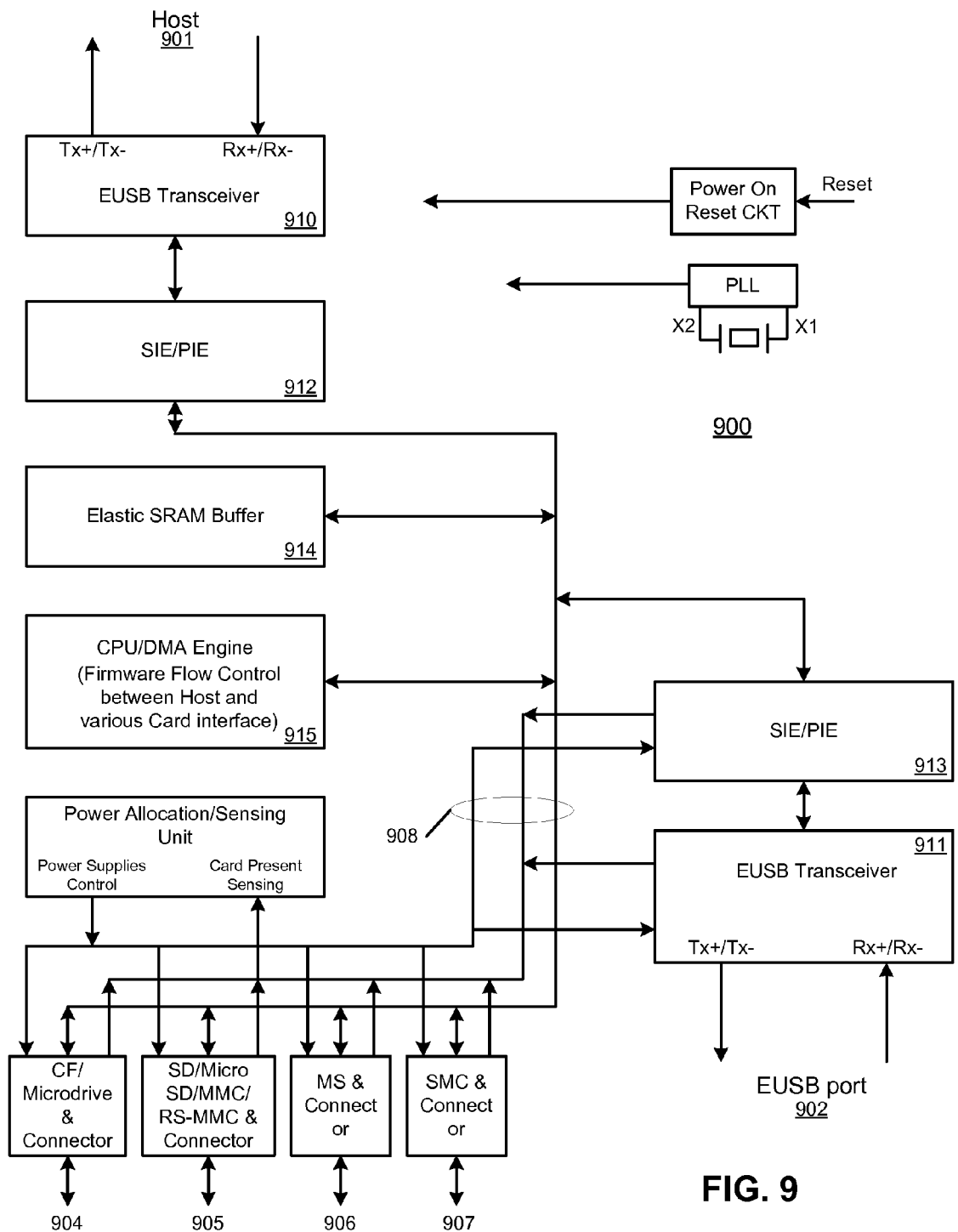
FIG. 9 is a block diagram illustrating an EUSB card reader according to one embodiment of the invention.

FIG. 9 is a block diagram illustrating an EUSB card reader according to one embodiment of the invention. For example, EUSB card reader 900 may be implemented as part of systems as shown in FIGS. 7 and 8. Referring to FIG. 9, EUSB card reader 900 includes a first EUSB transceiver 910 used to couple with a host 901 and a second EUSB transceiver 911 used to couple with another EUSB device or hub via another EUSB port 902. EUSB card reader 900 further includes a variety of ports or interfaces 904-907 that are capable of coupling with various types of portable cards as mentioned above. These ports are coupled via bus or buses 908 to various components of the card reader 900, including serial/parallel converters 912-913, SRAM (static random access memory) buffer 914 and CPU/DMA engine 915. The CPU/DMA engine 915 is configured to process tasks between all other peripheral ports. Elastic SRAM 914 is used to temporarily store data for the host, hub, and various cards.

FIG. 10 is a block diagram illustrating an EUSB card reader according to an alternatively embodiment of the invention. Referring to FIG. 10, a first EUSB link with both a receive and a transmit differential pair connects to serializer/deserializer 1050, while another link with another two differential pairs connects to serializer/deserializer 1060. Incoming parallel data from either link is multiplexed into upstream interface engine 1052, which performs EUSB protocol processing. Upstream EUSB controller 1054 controls upstream interface engine 1052 and other components to process the incoming parallel words, using instructions in RAM/ROM 1056. The processed incoming data is loaded into data packet FIFO (first-in-first-out) 1070 and moved by DMA engine 1072 under the control of local CPU 1076.

When the data is not for the local hub, the data in data packet FIFO 1070 is sent back down to downstream interface engine 1062. Downstream EUSB controller 1064 controls downstream interface engine 1062 and other components to process the outgoing parallel words, using instructions in RAM/ROM 1056. The processed outgoing data is buffered and sent to either serializer/deserializer 1050 or serializer/deserializer 1060, to continue the packet's journey either upstream or downstream.

Bus arbiter 1074 arbitrates between packets from serializer/deserializer 1050, and 1060. It is possible that packets arrive from both upstream and downstream links at the same time. Bus arbiter 1074 arbitrates among the simultaneous requests. Power-on reset circuit 1078 resets the hub, while phase-locked loop (PLL) 1068 generates an internal clock.

In addition, the EUSB card reader further includes a card reader elastic FIFO 1080 for temporarily storing data exchanged from various card interfaces 1081-1084 having corresponding card slots or receptacles as described above.

Figure 11:
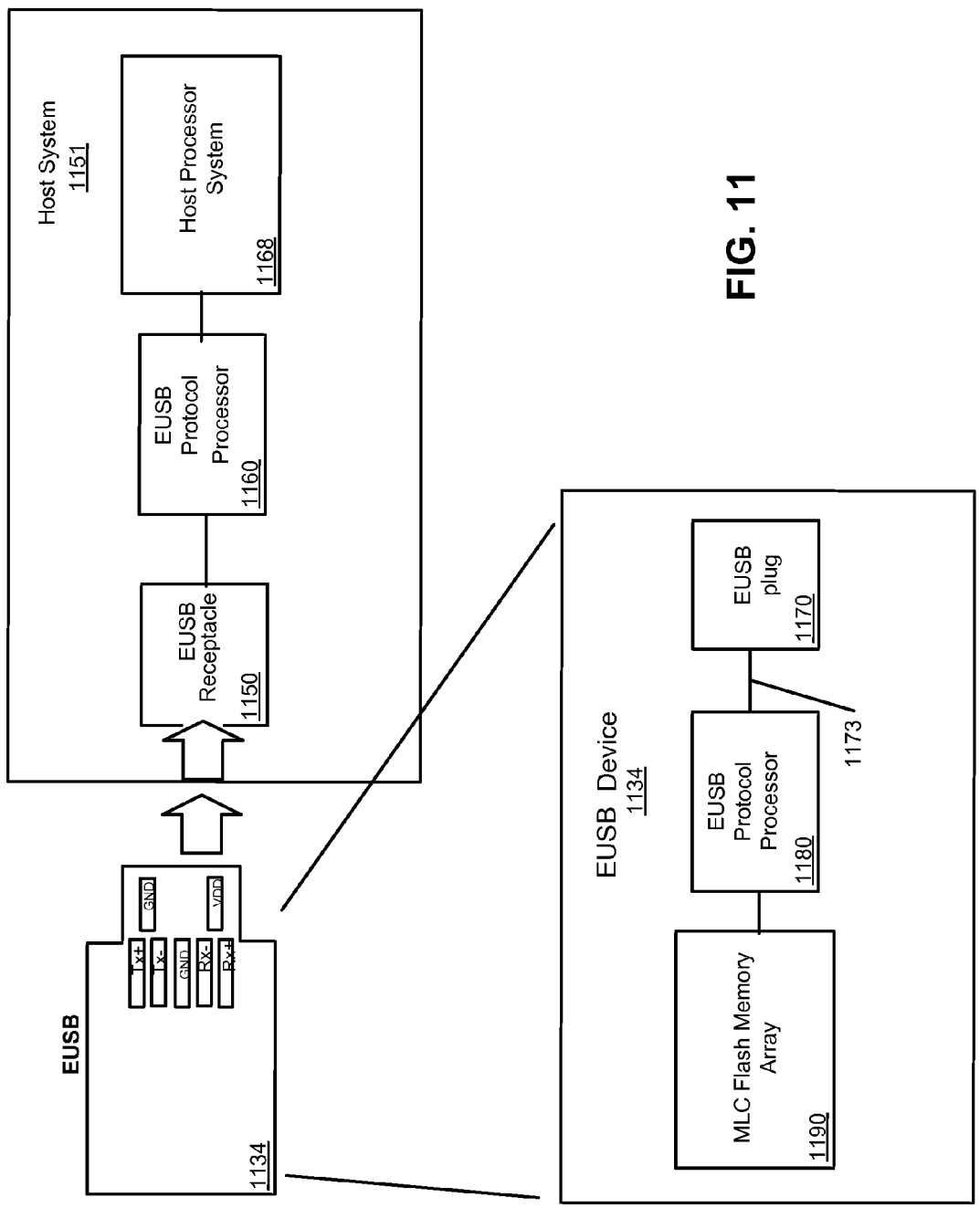
FIG. 11 is a block illustrating a host having a single-mode EUSB interface according to one embodiment of the invention.

FIG. 11 is a block illustrating a host having an EUSB interface according to one embodiment of the invention. For example, referring to FIG. 11, host 1151 may be a portable device such as a cellular phone or a digital camera, etc. having an EUSB receptacle 1150 to receive an EUSB device 1134. Host 1151 further includes a processor system 1168 using an EUSB protocol that is handled by EUSB protocol processor 1160. EUSB device 1134 includes an EUSB protocol processor 1180 for executing programs including device initialization and bus response programs. Bus interface 1173 transfers processed data from processor system 1180 using EUSB protocols to its plug interface 1170. Multi-level cell (MLC) memory 1190 is used to store data. Other components may also be included.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description below. In addition, embodiments of the present invention are not described with reference to any particular programming language. It will be appreciated that a variety of programming languages may be used to implement the teachings of embodiments of the invention as described herein.

A machine-readable medium may include any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An extended universal serial bus (USB) card reader device, comprising:
    a first extended USB (EUSB) connector to be coupled to an external host system, the first EUSB connector capable of communicating with the external host system according to extended USB protocols;
    a plurality of flash memory card sockets capable of receiving a plurality of flash memory cards inserted therein;
    a plurality of flash controllers coupled to the plurality of flash memory card sockets respectively, each corresponding to one of the flash memory card sockets and controlling the corresponding flash memory card sockets including reading and writing data from and to a flash memory card inserted in the associated socket;
    a memory for storing executable code;
    a processor coupled to each of the plurality of flash controllers, the processor executing the executable code retrieved from the memory to control each of the plurality of flash controllers in order to access the corresponding flash memory card inserted therein; and
    a second EUSB connector to be coupled to an external EUSB device using the extended USB protocols, wherein the external EUSB device is one of an EUSB slave device and an EUSB hub device.

2. The device of claim 1, wherein each of the plurality of flash memory card is one of Secure-Digital, Multi-media Card, Micro Secure-Digital, or Memory Stick card.

3. The device of claim 1, further comprising:
    a first serial engine for coupling the first EUSB connector with the processor; and
    a second serial engine for coupling the second EUSB connector with the processor.

4. The device of claim 3, further comprising a direct memory access (DMA) engine for transferring data between the external host and one or more of devices inserted into the plurality of flash memory card sockets and the EUSB interfaces.

5. A host computer system, comprising:
    a central processing unit (CPU);
    a memory controller coupled to the CPU via a processor bus;
    an IO (input/output) controller coupled to the memory controller;
    an extended universal serial bus (EUBS) interface circuit coupled to the IO controller, the EUSB interface is configured to receive an EUSB card reader, wherein the EUSB card reader comprises
        a first extended USB (EUSB) connector coupled to EUSB interface, the first EUSB connector capable of communicating with the CPU via the EUSB interface according to extended USB protocols;
        a plurality of flash memory card sockets capable of receiving a plurality of flash memory cards inserted therein;
        a plurality of flash controllers coupled to the plurality of flash memory card sockets respectively, each corresponding to one of the flash memory card sockets and controlling the corresponding flash memory card sockets including reading and writing data from and to a flash memory card inserted in the associated socket;
        a memory for storing executable code;
        a processor coupled to each of the plurality of flash controllers, the processor executing the executable code retrieved from the memory to control each of the plurality of flash controllers in order to access the corresponding flash memory card inserted therein; and
        a second EUSB connector to be coupled to an external EUSB device using the extended USB protocols, wherein the external EUSB device is one of an EUSB slave device and an EUSB hub device.

6. The system of claim 5, wherein each of the plurality of flash memory card is one of Secure-Digital, Multi-media Card, Micro Secure-Digital, or Memory Stick card.

7. The system of claim 5, wherein the EUSB card reader further comprises:
    a first serial engine for coupling the first EUSB connector with the processor; and
    a second serial engine for coupling the second EUSB connector with the processor.

8. The system of claim 7, wherein the EUSB card reader further comprises a direct memory access (DMA) engine for transferring data between the external host and one or more of devices inserted into the plurality of flash memory card sockets and the EUSB interfaces.

* * * * *